July 8, 1969  A. B. SABIN  3,453,839
CARGO TRANSPORT SYSTEM AND CONTAINER THEREFOR
Filed Oct. 26, 1967  Sheet 1 of 3

INVENTOR.
ALFRED B. SABIN
BY Flehr, Hohbach, Test,
Albritton & Herbert
ATTORNEYS

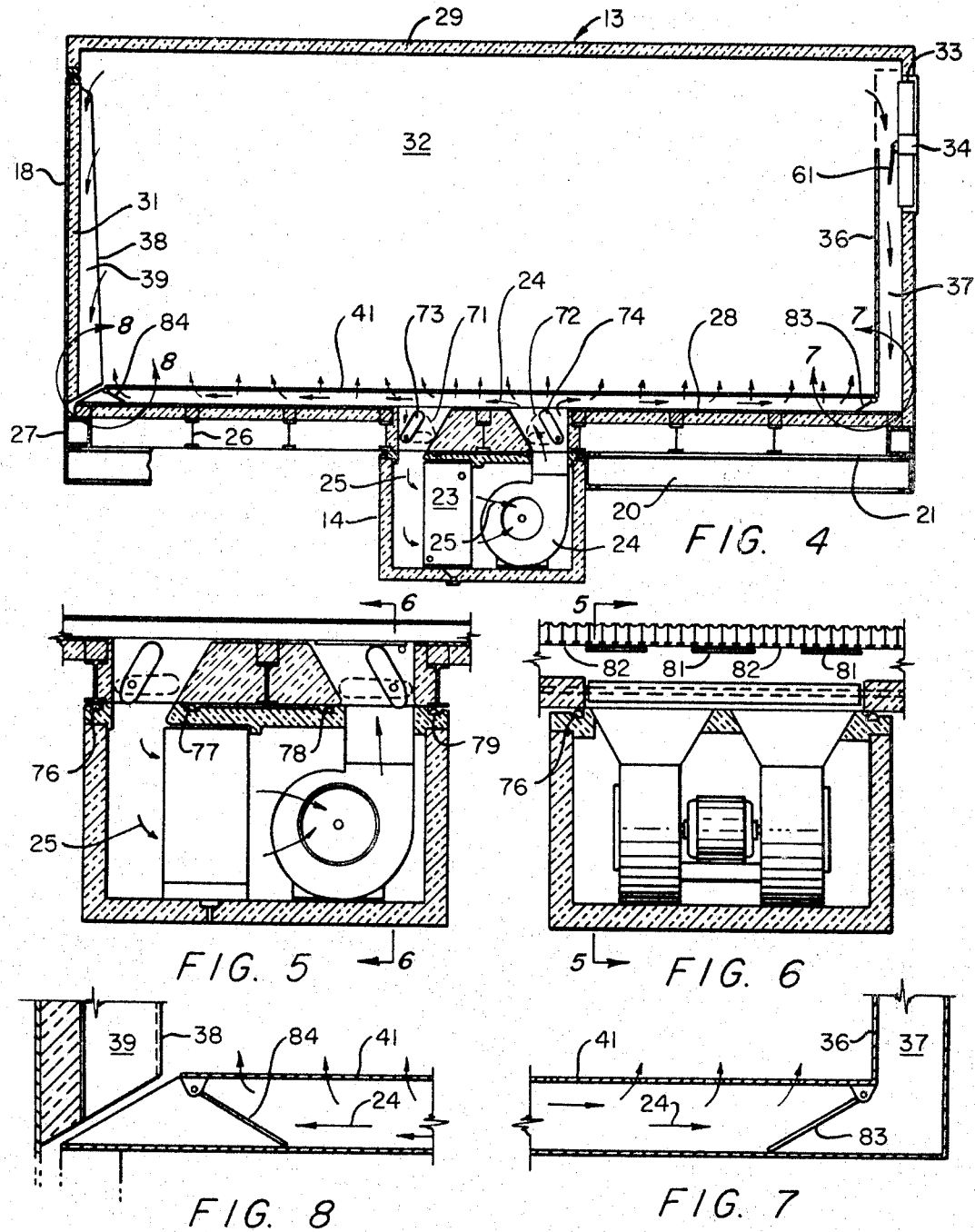

United States Patent Office 3,453,839
Patented July 8, 1969

3,453,839
CARGO TRANSPORT SYSTEM AND CONTAINER THEREFOR
Alfred B. Sabin, 826 Walla Vista,
Oakland, Calif. 94610
Filed Oct. 26, 1967, Ser. No. 678,446
Int. Cl. B60h *3/04;* F25d *17/06*
U.S. Cl. 62—239                    12 Claims

ABSTRACT OF THE DISCLOSURE

A cargo transport system and a container therefor in which the container's load-bearing floor structure provides air passages and an orifice pattern to assure uniform distribution of conditioned air through the overlying cargo. Conditioned air may be supplied either through dampered floor ports from a conditioner unit attached to the chassis of the highway transport vehicle or through a nose-end aperture which may be coupled to a ship's conditioned-air plenum, shore side refrigeration machinery or conventional attached refrigeration machinery.

Background of the invention

This invention relates generally to an intermodal cargo transport system and more especially to a cargo container unit for use therewith.

Present designs of refrigerated cargo containers, or vans referred to hereinafter as conventional containers, are based on delivery of chilled air into the overhead space reserved for that purpose over the top of the cargo within the container. Usually, the chilled air is supplied by a refrigeration unit attached to the container. The refrigeration unit remains with the container as the container is transferred from, say, a ship to a highway vehicle, rail car or vice versa.

Also in the conventional container the air discharged over the top of the cargo returns to the inlet of the refrigeration unit through paths of least resistance. Lacking any positive air distribution control, some places in the cargo receive little or no air circulation. This results in warm zones and consequent cargo deterioration. Furthermore, such short circuiting or by-passing cause false response by thermostatic control instruments and interruption of heat removal by air conditioning means at a time when maximum refrigeration may be essential for preservation of the perishable cargo.

Summary of the invention and objects

It is the purpose of this invention to eliminate such faults of the conventional container and to provide simple solutions to problems of transfer from one mode of transportation to another, such as from highway or rail car chassis, to ship or vice versa.

The present invention provides a cargo container including a floor which is in the form of a more or less continuous diaphragm supported by a multiple longitudinal webs which, together with the bottom lining of the container, form a series of longitudinal flues. Conditioned air under pressure is supplied to these flues and is allowed to escape through orifices formed in the floor and spaced to provide uniform distribution of the conditioned air moving upwardly through the cargo. Air is withdrawn from the upper region of the container, conditioned and recirculated.

The cargo container of the present invention preferably has no mechanically attached refrigeration unit. Conditioned air may be supplied either through dampered floor ports from a conditioner unit attached to the highway or rail car chassis or, when at sea, through a nose-end aperture coupled to a ship's conditioned air supply.

The container floor structure provides both cargo support and flues for air movement. The top surface is a more or less continuous diaphragm supported by a plurality of vertical webs which with the bottom container lining define a plurality of parallel longitudinal air flues. Above each web are flat lands for cargo support with parallel shallow troughs therebetween. Suitable nozzles or orifices penetrate the troughs allowing pressurized air beneath the diaphragm to escape into the troughs and thence find its way upward through interstices in the cargo. Emerging air above the cargo is returned to the air conditioner for recirculation.

It is an object of the present invention to provide an improved cargo container with controlled air flow to assure uniformity of environment within a mass of cargo placed therein and, therefore, relatively uniform rates of heat removal from all parts of the same.

It is another object of the present invention to provide a cargo container having a diaphragm-type floor which includes lands and valleys having ports which provide for the circulation of air from longitudinal floor flues upwardly through the cargo.

It is another object of the present invention to provide a vehicular chassis with attached refrigeration machinery on which the intermodal container may be mounted for land transport.

It is another object of the present invention to provide automatic operation of container floor dampers to open and close the dampers as required.

The foregoing ond other objects of the invention will become more clearly apparent from the following description taken in conjunction with the accompanying drawings.

Brief description of the drawings

FIGURE 4 is a sectional elevational view of a cargo container in accordance with the invention.

FIGURE 5 is a view taken along the line 5—5 of FIGURE 6 showing chassis-mounted air conditioning apparatus and the bottom portion of an associated container.

FIGURE 6 is an enlarged view taken along the line 6—6 of FIGURE 5.

FIGURE 7 is an enlarged view of the portion 7—7 of FIGURE 4.

FIGURE 8 is an enlarged view of the portion 8—8 of FIGURE 4.

Description of the preferred embodiments

Figure 1:
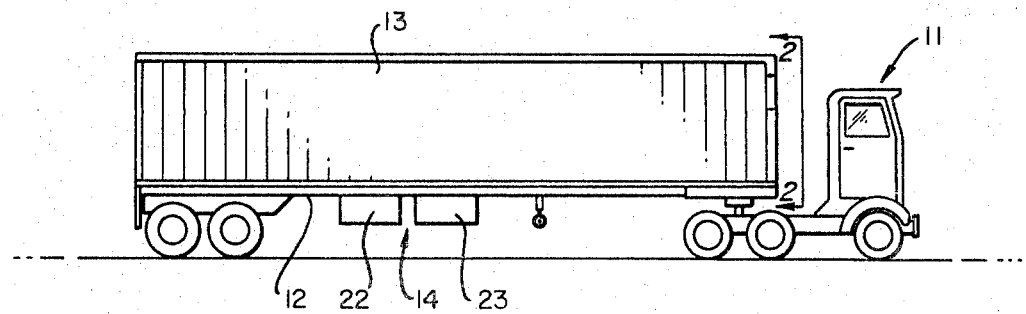
FIGURE 1 is a side elevational view showing a cargo container mounted on a highway vehicle chassis.
Figure 2:
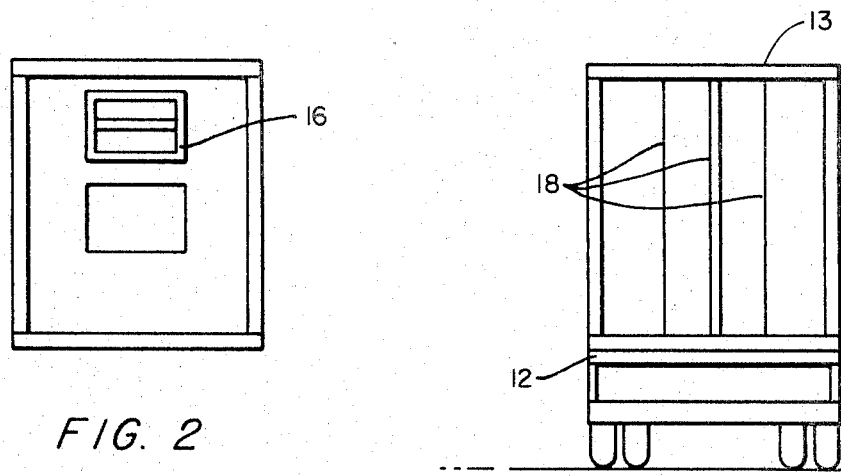
FIGURE 2 is a view taken along the line 2—2 of FIGURE 1.
Figure 3:
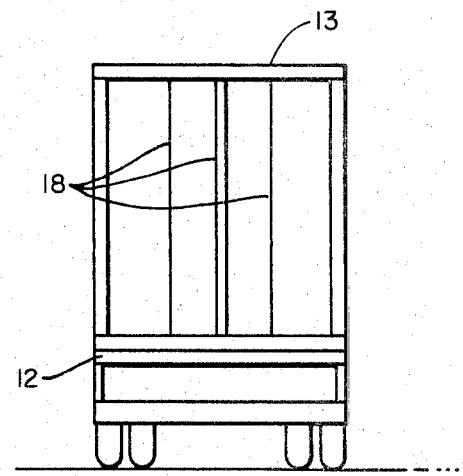
FIGURE 3 is a rear view of the equipment shown in FIGURE 1.

Referring to FIGURES 1-3, there is shown a highway tractor 11 connected to a flat bed chassis 12 which supports cargo container 13. Air conditioning equipment 14 is shown suspended from the chassis of the trailer and is adapted to condition the air within the container 13 as will be presently described. The front end of container 13 includes an opening 16 with an insulated plug. The opening is suitable for being coupled to ports in a ship's plenum conditioned-air supply. During highway transport, these ports are closed.

It will become apparent that although a highway vehicle is shown, the chassis on which the cargo containers are mounted may comprise a flat bed railway car or other suitable transportation means.

Referring to FIGURE 4, there is schematically illustrated the chassis 20 of a highway carrier. The chassis shown is a metal frame 21 serving to support the container 13 and the air conditioning or refrigeration equipment 14 which may be disposed between a pair of longitudinal structural shapes.

The refrigeration or air conditioning apparatus includes a compressor and condenser 22, an evaporator 23 and a fan 24 which serves to circulate the air through the evaporator and container. The air flows as indicated by the arrows 25.

Cargo container 13 is shown mounted on the frame 21. The bottom of the cargo container includes a plurality of transverse joists 26 and peripheral beams 27 which support the insulated bottom member 28. The container includes insulated top and side walls 29, 31 and 32, respectively. The forward end of the container may include an opening 33 adapted to receive a removable plug such as the plug 34. The front of the container includes a spaced wall 36 which may be of relatively thin material to define a vertical flue 37. Similarly, the doors may carry spaced baffles or walls 38 to define vertical flues 39.

In accordance with the present invention, the container floor 41 is in the form of a diaphragm supported by a plurality of longitudinal webs. The floor is more clearly shown in FIGURE 9 and includes the diaphragm 41 which comprises a plurality of lands 42 adapted to receive and support the cargo and a plurality of troughs 43 having walls 44 providing for drainage of any condensate and also for the passage of conditioned air, as will be presently described. The floor is supported in spaced relationship with respect to the bottom 28 by a plurality of longitudinal webs 46. These longitudinal webs form, together with the bottom 28 and floor 41, a plurality of longitudinal flues 47. The floor may be formed of a plurality of extruded members such as the member shown in FIGURE 9. The members can be placed to mate with one another whereby the notch 48 is adapted to receive the lip 49 of an adjacent unit to form a continuous floor. The lip associated with the side unit is adapted to fit into the ledge 51 formed in the side wall.

Figure 9:
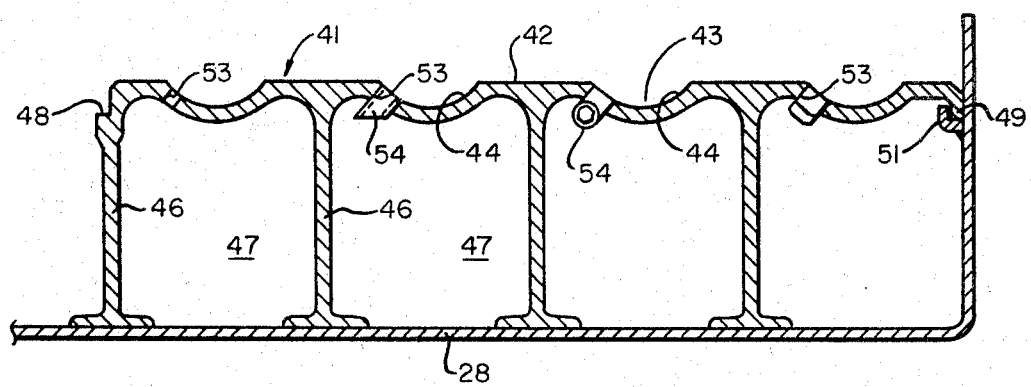
FIGURE 9 is an enlarged view of a floor structure in accordance with the invention.

There are formed at spaced intervals along the walls 44 of each of the valleys, orifices or holes 53 for communicating between the flues 47 and the interior of the container. In FIGURE 9, there is shown a plurality of holes 53 arranged on the walls of the troughs. By appropriately dimensioning and positioning the holes, uniform distribution of air through the cargo can be obtained. The flow of air through each hole can be made adjustable by providing a plurality of rotatable nozzles 54 in the holes 53.

Figure 10:
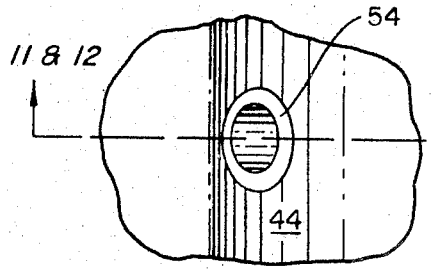
FIGURE 10 shows a port suitable for use in the floor of a container of the present invention.
Figure 11:
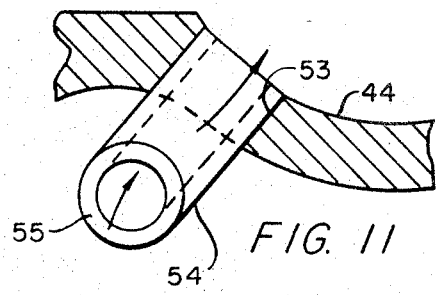
FIGURE 11 is a view taken along the line 11—11 of FIGURE 10.
Figure 12:
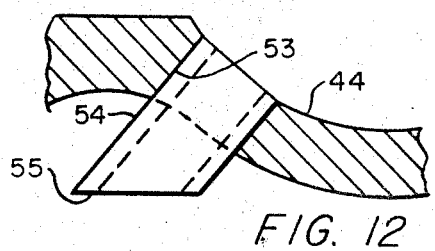
FIGURE 12 is a view taken along the line 12—12 of FIGURE 10.

The nozzles have bevelled faces 55 and are rotatably supported in openings 53 in the sloping wall. A nozzle of this type is more clearly shown in enlarged view FIGURES 10, 11 and 12. The nozzle fits tightly in the openings 53 and extends downwardly into an associated flue. The bevelled face can be oriented to directly face the air stream whereby the projected area of the opening is relatively large to intercept a substantial portion of the air stream in the flue and directed upwardly through the nozzle and into the cargo above. The nozzle may be turned ninety degrees as shown in FIGURE 12 where no air is intercepted. The amount of air can be controlled between these two conditions by turning the nozzle to an intermediate position. By rotating the various nozzles disposed longitudinally along a flue it is possible to control the amount of ar flowing upwardly. When flow into the cargo compartment has been adjusted so that it is uniform along the entire length of a flue, the nozzles may be permanently fixed.

Figure 13:
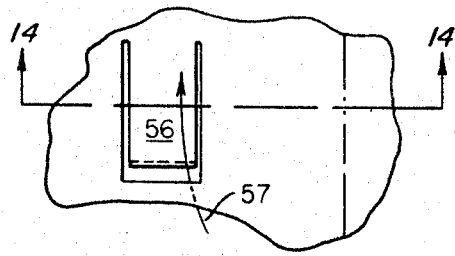
FIGURE 13 shows another type of port for use with the floor of a container of the present invention.
Figure 14:
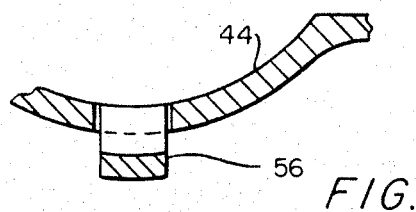
FIGURE 14 is a sectional view taken along the line 14—14 of FIGURE 13.

An alternative arrangement is shown in FIGURES 13 and 14 where tongues 56 may be cut into the sloping wall 44 and bent downwardly to intercept the air and direct it upwardly as shown generally by the arrow 57. The amount of air which is intercepted by the downwardly extending tongue is controlled by the size and angle of the tongue.

It is to be noted that by the formation of the orifices on the side walls of the troughs, any foreign matter or moisture which condenses will not plug the orifices but will tend to collect along the bottom of the troughs and flow longitudinally along the same to drains (not shown) at the ends of the cargo container. Furthermore, by providing lands 42, there is a space between the ports and the cargo whereby the air can then circulate upwardly through the interstices of the cargo.

Air may be supplied to the longitudinal flues in one of two ways. First, the air may be supplied to the nose end of the vehicle, through flue 37. The pressure rotates the damper 61 clockwise to close the upper end of the flue 37 or it may be manually set. The air then flows downwardly as indicated by the arrows, lifts the dampers 83, and flows into the longitudinal flues where it travels along the flues from one end of the container to the other and upwardly through the spaced nozzles or orifices. The air is then withdrawn from the upper region of the cargo container, conditioned and recirculated.

In FIGURE 4, the air is shown being introduced at the bottom center of the cargo container. The cargo container includes a pair of spaced transverse openings 71 and 72 which extend across the bottom of the container. Rotatable dampers 73 and 74 are mounted in the openings 71 and 72, respectively. When the container is on a ship, the dampers 73 and 74 are closed and the container receives refrigerated or conditioned air from the nose end ports. However, when the container is associated with chassis-mounted refrigeration apparatus, such as shown in FIGURE 4, the dampers are rotated automatically or manually to provide communication with the floor flues.

Suitable sealing means, such as an inflated or sponge type gasket, provides a seal between the cargo container and the air conditioning means when the container is mounted on the carrier. A pair of gaskets 76, 77 mounted on the air conditioning apparatus, FIGURES 5 and 6, provide a seal between the container and the air conditioning apparatus.

In this manner, openings 71 and 72 communicate with the inlet and outlets of the refrigeration apparatus. Selected longitudinal flues formed by the webs are closed at the top of the opening 71 which communicates with the inlet to the refrigeration apparatus. Alternate flues are closed at the opening 72 which communicates with the outlet of the refrigeration apparatus. A group of dampers is shown at 81, FIGURE 6. In the instance shown, closed dampers 81 prevent conditioned air from travelling into the corresponding return air flues. At the other opening 71, selected flues are open whereby they serve as the return ducts for the refrigeration system. The refrigerated air which is introduced through opening 72 travels in both directions along the longitudinal flues 82 and into the cargo space through associated orifices. At the two ends of these flues there are provided manually or gravity-operated dampers 83 and 84. The dampers 83 and 84 are closed to block the ends of the flues 82 whereby the air builds up pressure to travel upwardly through the orifices on nozzles in the diaphragm floor.

The return air from the top of the container travels downwardly to the flues 37 and 39 through the dampers associated with the return air flues and the air travels to the evaporator through the opening 71.

In summary, conditioned air is supplied under the floor at the mid-length of the container, travels along the longitudinal flues formed by the diaphragm, floor and webs, travels upwardly through the orifices formed in the floor, diaphragm circulates upwardly through the cargo and is returned from the two ends as indicated generally by the arrows, then travels along the floor to the mid-length of the container where it is again conditioned. This provides a uniform distribution of air through the cargo and an enveloping of the cargo by the air travelling along the top, sides and bottom of the container.

Figure 15:
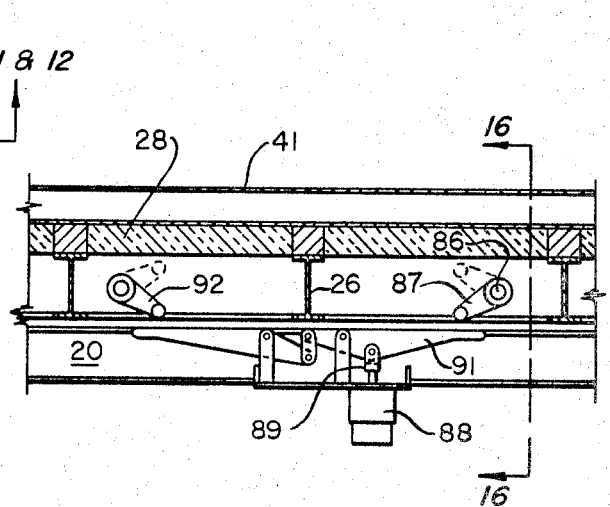
FIGURE 15 is a view showing means for automatically controlling the dampers disposed in the cargo container bottom openings.
Figure 16:
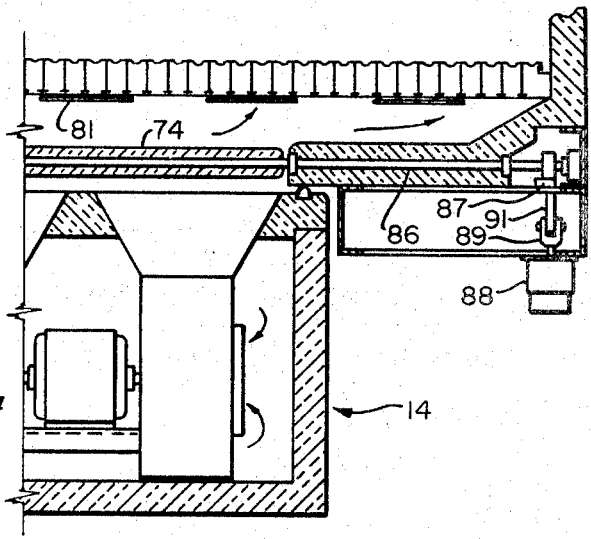
FIGURE 16 is a sectional view taken along the line 16—16 of FIGURE 15.

Although the dampers 73 and 74 may be manually operated, an automatic means is shown in FIGURES 15 and 16. The damper 74 shown in FIGURE 16 is connected to an operating mechanism 87. A drive unit 88, may be a solenoid connected in circuit with the fan control, with a plunger 89, to rotate lever 91. Rotation of lever 91 will serve to operate both dampers. The dampers may be spring-loaded whereby they are normally closed. Thus, when the container is removed from the highway carrier or when the refrigeration unit is defrosting or idle, the dampers will close and the container be sealed.

While this description of the invention shows a single container, say 40 feet long, mounted on the highway chassis, it is obvious that two containers 20 feet long are also possible by providing two smaller evaporator pods positioned in the chassis to match floor ports in each 20 foot container. Both evaporators could be served by one engine-compressor unit 22.

Thus, it is seen that there has been provided an improved intermodal containerized cargo system which permits chassis mounting of the refrigeration apparatus and which effectively conditions the cargo by the improved air flow provided by the longitudinal floor flues.

What is claimed is:

1. A cargo container for use in a containerized cargo system of the type wherein the cargo container is adapted to be coupled to an air conditioning means for conditioning the air in the container comprising an insulated enclosure including a floor, means providing access to said enclosure for placing and removing cargo from said container, said floor comprising a continuous diaphragm supported from the bottom of said container by a plurality of parallel webs which define with said bottom and floor a plurality of longitudinal floor flues, a plurality of orifices formed in said floor along selected flues whereby conditioned air introduced into said flues travels upwardly through said orifices and upwardly through the cargo, and means for removing the air from the top region of said containers and directing it to said air conditioning means.

2. A cargo container as in claim 1 in which said orifices include means for controlling air flow therethrough.

3. A cargo container for use in a containerized cargo system of the type wherein the cargo container is adapted to be separably coupled to an air conditioning means for conditioning the air in the container comprising an insulated enclosure including a floor, means providing access to said enclosure for placing and removing cargo from said container, said floor including a plurality of parallel lands for supporting the cargo and troughs providing air circulating and drainage paths comprising a continuous diaphragm supported from the bottom of said container by a plurality of parallel webs which define with said bottom and floor a plurality of longitudinal floor flues, a plurality of orifices formed along selected flues whereby conditioned air introduced into said flues travels through said orifices and upwardly through the cargo, and means for removing the air from the top region of said containers and directing it to said air conditioning means.

4. A cargo container as in claim 3 in which said orifices include means for controlling air flow therethrough.

5. A cargo container as in claim 3 wherein the valleys have sloping sides and said orifices are arranged on the sloping sides.

6. A cargo container for use in a containerized cargo system of the type wherein the cargo container is adapted to be coupled to an air conditioning means for conditioning the air in the container comprising an insulated enclosure including a floor, means providing access to said enclosure for placing and removing cargo from said container, said floor comprising a continuous diaphragm supported from the bottom of said container by a plurality of parallel webs which define with said bottom and floor a plurality of longitudinal floor flues, a plurality of orifices in the form of a tongue of metal cut into the floor and depressed into selected flues along the same whereby conditioned air introduced into said flues travels through said orifices and upwardly through the cargo, and means for removing the air from the top region of said containers and directing it to said air conditioning means.

7. A cargo container for use in a containerized cargo system of the type wherein the cargo container is adapted to be coupled to an air conditioning means for conditioning the air in the container comprising an insulated enclosure including a floor, means providing access to said enclosure for placing and removing cargo from said container, said floor comprising a continuous diaphragm supported from the bottom of said container by a plurality of parallel webs which define with said bottom and floor a plurality of longitudinal floor flues, a plurality of orifices comprising inserts disposed in openings formed in the floor along selected flues whereby conditioned air introduced into said flues travels through said orifices and upwardly through the cargo, and means for removing the air from the top region of said containers and directing it to said air conditioning means.

8. A cargo container as in claim 7 in which said inserts are in the form of tubes having a bevelled edge and rotatably adjustable within said openings.

9. A cargo container for use in a containerized cargo system of the type wherein the cargo container is adapted to be coupled to an air conditioning means for conditioning the air in the container comprising an insulated enclosure including a floor, means providing access to said enclosure for placing and removing cargo from said container, said floor comprising a continuous diaphragm supported from the bottom of said container by a plurality of parallel webs which define with said bottom and floor a plurality of longitudinal floor flues, a plurality of orifices formed along selected flues whereby conditioned air introduced into said flues travels through said orifices and upwardly through the cargo, means for removing the air from the top region of said containers and directing it to said air conditioning means, a pair of transverse openings are formed in the bottom of the container to provide communication to the floor flues, and closures cooperating with said openings in said flues to thereby provide communication between each of said transverse openings and selected one of said flues whereby air may be introduced into selected flues and removed from others to thereby provide for conditioning of the air from air conditioning means mounted beneath the container.

10. A cargo container as in claim 9 wherein said transverse openings include dampers.

11. A cargo container as in claim 10 including means for automatically operating said dampers whereby the dampers are closed when the cargo container is removed from the highway carrier or when the air conditioning is idle.

12. A cargo container for use in a containerized cargo system of the type wherein the cargo container is adapted to be coupled to an air conditioning means for conditioning the air in the container comprising an insulated enclosure including a floor, means providing access to said enclosure for placing and removing cargo from said container, said floor comprising a continuous diaphragm supported from the bottom of said container by a plurality of parallel webs which define with said bottom and floor a plurality of longitudinal floor flues, a plurality of orifices sized, spaced and arranged along the flues to produce relatively uniform distribution of air over the floor area whereby conditioned air introduced into said flues travels through said orifices and upwardly through the cargo, and means for removing the air from the top region of said containers and directing it to said air conditioning means.

References Cited

UNITED STATES PATENTS

| | | | |
|---|---|---|---|
| 2,518,316 | 8/1950 | Henney | 62—187 |
| 2,914,927 | 12/1959 | Corhanidis | 62—237 |
| 3,166,916 | 1/1965 | Burrows | 62—265 |
| 3,246,592 | 4/1966 | Roth | 62—239 |
| 3,359,752 | 12/1967 | Westling | 62—239 |

WILLIAM J. WYE, *Primary Examiner.*

U.S. Cl. X.R.

62—187, 237, 265, 408, 418